May 20, 1930.  R. V. RITCHEY  1,759,713
TIRE EXPANDER
Filed July 6, 1925  3 Sheets-Sheet 1

INVENTOR.
ROSCOE V. RITCHEY
BY
ATTORNEY.

May 20, 1930. R. V. RITCHEY 1,759,713
TIRE EXPANDER
Filed July 6, 1925 3 Sheets-Sheet 3

INVENTOR.
ROSCOE V. RITCHEY
BY
ATTORNEY.

Patented May 20, 1930

1,759,713

UNITED STATES PATENT OFFICE

ROSCOE V. RITCHEY, OF AKRON, OHIO, ASSIGNOR TO THE FIRESTONE TIRE AND RUBBER COMPANY, OF AKRON, OHIO, A CORPORATION OF OHIO

TIRE EXPANDER

Application filed July 6, 1925. Serial No. 41,467.

This invention relates to expanders for use in shaping pneumatic tire casings made by the flat-band method into tire-shape prior to vulcanization, or for use in preliminary stretching or shaping of banded plies used in building tires on torus-shaped cores.

Heretofore different types of devices have been employed in the art for the above-described purposes, there being numbered among these one type including a circumferential series of expanding shoes adapted to be spread apart radially against the inner surface of the flat band by suitable means simultaneously operating all the shoes, the shoes being so shaped as to properly form the tire to shape by a stretching action thereon, and means being provided normally to hold the shoes contracted.

The present invention is directed toward an improved expander, wherein the shaping of the tire is more evenly and uniformly accomplished, the shaping element of the device also being such as to naturally contract, due to its inherent resilient nature.

An important object of the invention is to provide an annular expander of yieldable stretchable material, preferably a ring-shaped, helical, tensile spring, and means for expanding the same uniformly throughout its circumference.

The foregoing and other objects are obtained by the construction illustrated in the accompanying drawings and described in detail below. It is to be understood that the invention is not limited to the specific construction shown and described.

Figure 1:
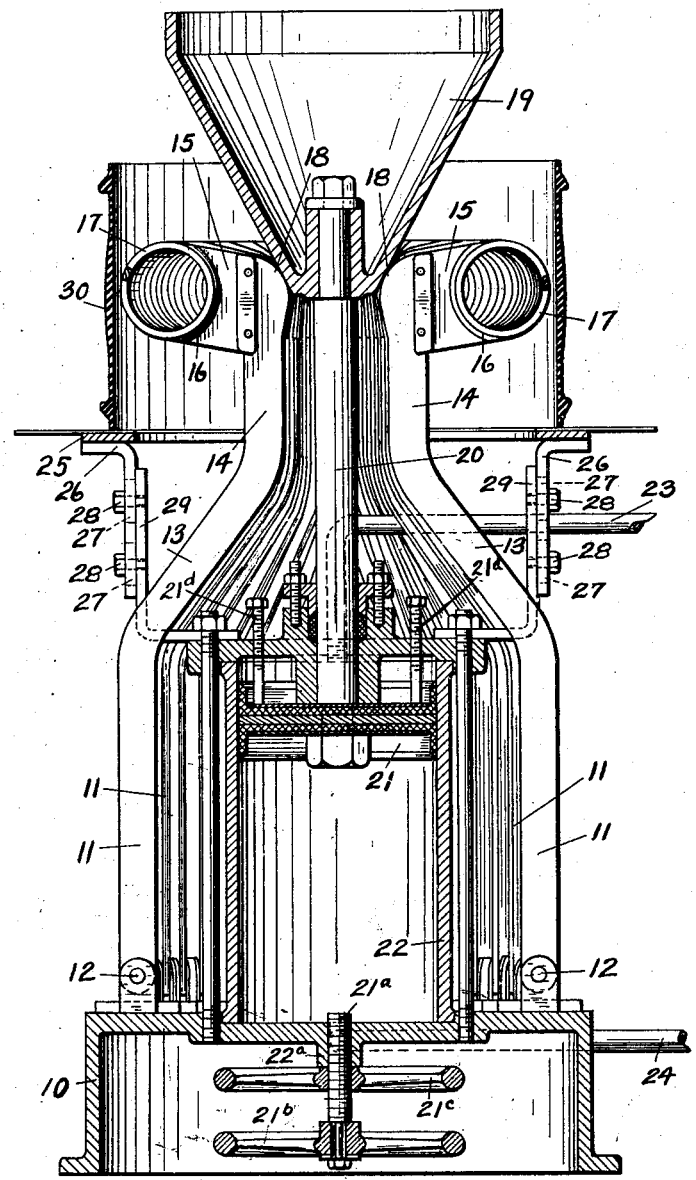
Figure 1 is a vertical diametral section through a device embodying the invention illustrating the expander in a contracted position with a flat-band tire casing mounted thereon in readiness to be shaped.

Referring to the drawings, 10 represents a hollow circular pedestal, having mounted thereon a circumferential series of comparatively closely spaced levers 11—11, pivoted at 12, 12 on said pedestal, and each being formed so as to extend vertically upwardly from the pedestal 10 and then inwardly as at 13, 13 and again upwardly at 14, 14 so that at their upper ends, the levers 11 are arranged in a comparatively small circle. The outer sides of the levers at their upper ends carry shoes 15, 15 formed with outer concave faces 16, 16, and seated on said faces is a ring-shaped, helical, tensile spring 17 adapted to retain itself in position on said faces by its inherent contractile property.

The inner sides of the upper portions of levers 11 are formed with cam faces 18, 18 arranged to be engaged by an inverted spreading cone 19 secured on a reciprocating rod 20 arranged in the center of the circle of levers 11 and adapted to be reciprocated by a piston 21 in a cylinder 22 mounted on pedestal 10 within the circle of levers 11. The cone 19 is so arranged on rod 20 that urging of the same downwardly by operation of piston 21 in cylinder 22 will cause the cone 19 by engagement with the faces 18 of levers 11 to spread the levers 11 in the manner shown in Figure 2. Other suitable spreading devices may be employed and means other than the piston 21 may be used to operate cone 19. To supply a fluid under pressure to the top of the cylinder 22, a pipe 23 is connected thereto, and to supply fluid under pressure to the bottom thereof, a pipe 24 is connected thereto.

In order that the degree of stretch imparted to a band may be determinate, there are provided means by which the stroke of piston 21 may be varied. This means includes an adjusting screw 21$^a$ threaded upwardly through the bottom of cylinder 22 and operable by a hand wheel 21$^b$, a lock wheel 21$^c$ being threaded onto screw 21$^a$ so as to provide for locking the screw 21$^a$ in an adjusted position by being screwed against a projecting sleeve 22$^a$ formed on the lower surface of cylinder 22.

To limit the degree of contraction of the expander when used on tires of larger diameter than that shown, set screws 21$^d$, 21$^d$ may be threaded through the top of cylinder 22 so as to limit the upward movement of piston 21.

Arranged about the levers 11 beneath spring 17 is an annular support or table 25 mounted on brackets 26, 26 slotted as at 27, 27 and bolted through said slots by bolts 28, 28 onto brackets 29, 29 mounted on cylinder 22 and extending between certain of levers 11 to the outer side thereof, whereby the support 25 may be adjusted to various vertical positions with respect to spring 17.

Figure 2:
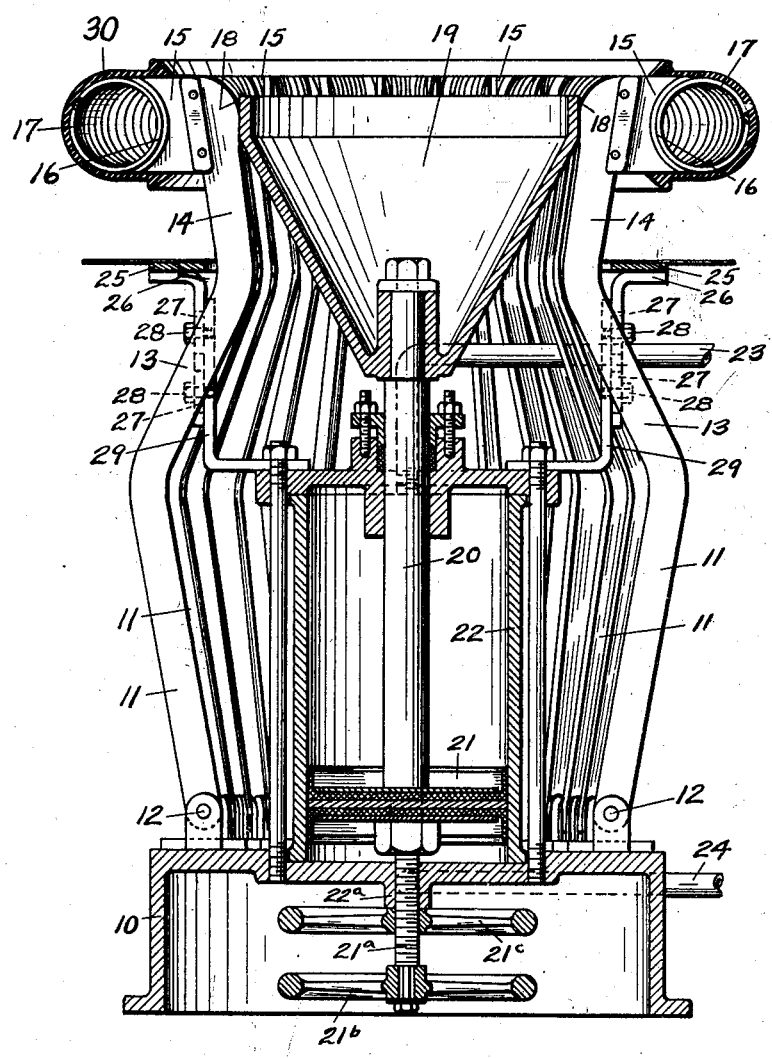
Figure 2 is a similar view on line 2—2 of Figure 3 illustrating the expanded position of the device, showing the manner in which the casing is shaped.
Figure 3:
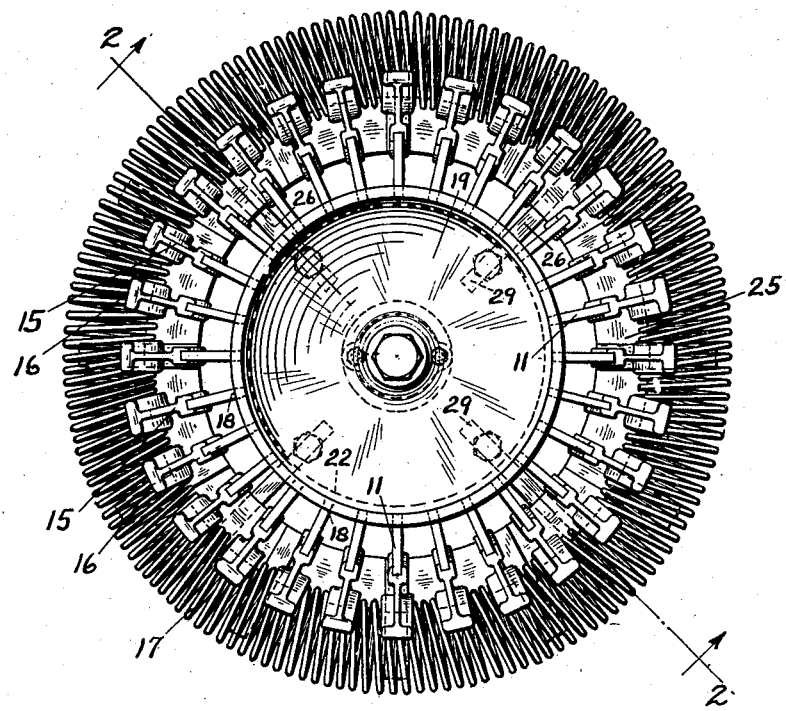
Figure 3 is a plan view of the device when expanded.

In operation, a band, such as indicated at 30, is mounted on table 25 in the manner shown in Figure 1, the table being adjusted as will be understood to centralize the band with respect to spring 17. Piston 21 is now operated to urge cone 19 downwardly whereby levers 11 are spread apart, thus expanding spring 17 in the manner clearly shown in Figures 2 and 3. The band 30 is thus formed into horseshoe shape in section (Figure 2). The piston 21 engages the upper end of screw 21$^a$ which is originally positioned so as to determine the desired degree of stretch of band 30.

The piston 21 is then moved upwardly to operate cone 19 upwardly, whereby spring 17 contracts and causes levers 11 to return to their original positions, the spring 17 thus contracting out of the formed band 30 which is then removed from the device to be vulcanized or for other operations.

It will be seen from the foregoing that the spring 17 will stretch uniformly throughout and will thus uniformly shape and stretch the band. By the use of the spring, the non-uniform action of rigid shoes is avoided and the use of separate contracting means is obviated, the contractile nature of the spring being such as to bring about contraction of the device.

The construction provided is thus exceedingly simple and inexpensive as well as being more efficient in results than prior devices.

Modifications of the invention may be resorted to without departing from the spirit thereof or the scope of the appended claim.

What I claim is:

Apparatus of the class described, comprising a circumferential series of levers pivoted at one end, an arcuate shoe mounted on each lever at its other end, an annular, helical, tensile spring supported by said shoes and tending to force the levers radially inward, a cone-shaped cam engaging the last-named end of each of said levers, means for reciprocating the cam to swing the levers radially outward and expand said spring, and means for limiting the motion of said reciprocating means to a predetermined degree, thus limiting also the radial expansion of the spring.

ROSCOE V. RITCHEY.